C. V. HALL.
MOTION PICTURE PROJECTING APPARATUS.
APPLICATION FILED OCT. 13, 1919.
1,356,140.
Patented Oct. 19, 1920.
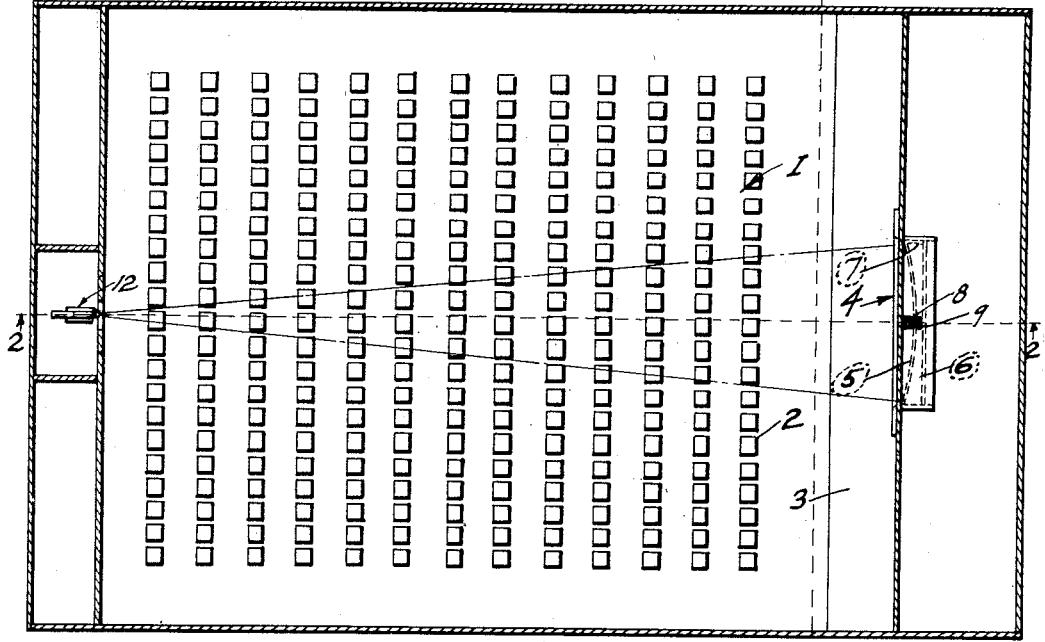
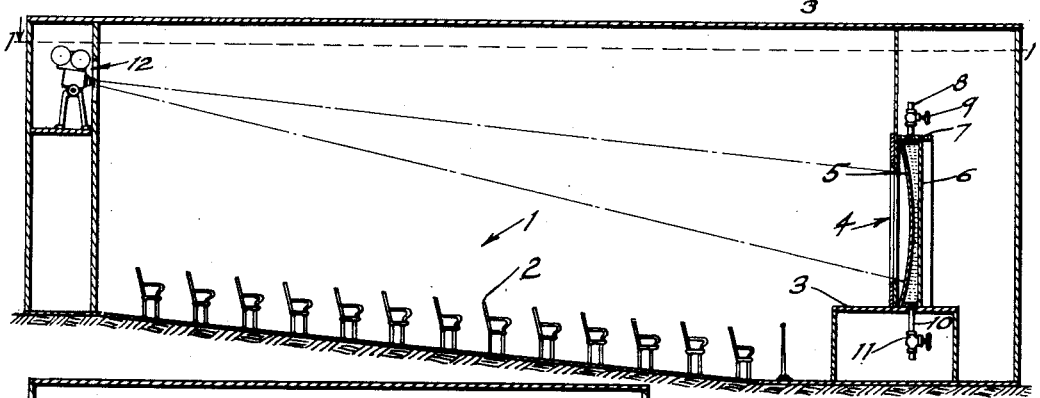
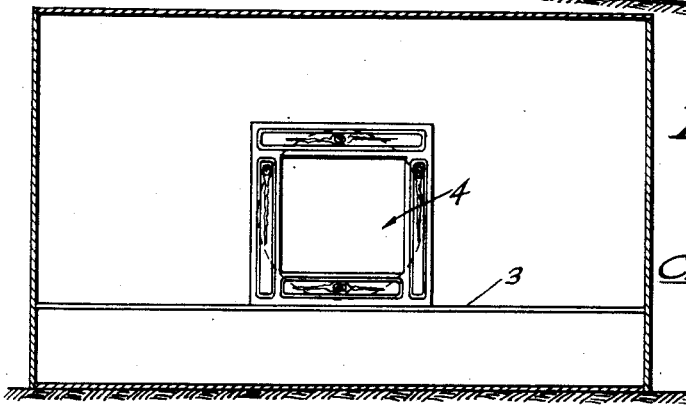
INVENTOR.
CHARLES VICTOR HALL.
BY *Hazard & Miller*
ATTORNEYS.

UNITED STATES PATENT OFFICE.

CHARLES VICTOR HALL, OF LOS ANGELES, CALIFORNIA, ASSIGNOR OF ONE-TENTH TO JOHN E. LEONARD, OF LOS ANGELES, CALIFORNIA.

MOTION-PICTURE-PROJECTING APPARATUS.

1,356,140.  Specification of Letters Patent.  Patented Oct. 19, 1920.

Application filed October 13, 1919. Serial No. 330,411.

*To all whom it may concern:*

Be it known that I, CHARLES VICTOR HALL, a citizen of the United States, residing at Los Angeles, in the county of Los Angeles and State of California, have invented new and useful Improvements in Motion-Picture-Projecting Apparatus, of which the following is a specification.

My invention relates to improvements in screens for showing motion pictures and the like.

The objects of my invention are to provide a screen upon which moving pictures may be projected that will give a depth impression or stereoscopic effect to the pictures; another object being to provide a screen having a lenticular member behind which is positioned a screen member; a further object being to provide a screen comprising a lenticular member having an opaque screen surface at its back side, other objects will appear hereinafter.

Figure 1 of the drawings, is a plan view of a picture theater showing a stage upon which is mounted an object screen embodying the principles of my invention.

Fig. 2 is a side elevation of a theater and stage showing the object screen in sectional elevation viewed from the side.

Fig. 3 is a front view looking toward the stage showing the object screen in front elevation.

More specifically 1 indicates an audience chamber having the seats 2 and a stage 3.

In carrying out my invention a screen 4 is provided of a size sufficient to cover the view of the stage setting. The screen comprises a curved front lenticular wall 5 and a flat back wall 6 having a screen surface, said walls being sealed together and properly spaced by a side member 7. Through the top of the side member 7 is placed an inlet conduit 8 carrying a valve 9 and at the bottom of the screen through the side member 7 is a discharge conduit 10 carrying a valve 11.

At the back end of the theater is positioned a moving picture projecting means 12.

In the operation of the device the screen 4 is filled with a proper fluid such as alcohol and the light rays of the projecting means carrying the pictures to be portrayed are directed toward the screen.

It is here explained that the front wall 5 of the screen is transparent and the fluid body carried within the screen is transparent or may be colored or may have coloring matter in fixed or moving zones within a transparent fluid body. The back wall of the screen is flat and is of opaque material or may have an opaque plating upon the inside or the outside, the material of which it is composed or the composition of the plating, if so constructed, is of such nature that the light rays carrying the picture impression in passing through the front wall of the screen and through the fluid body will be caught and the pictures will become visible upon the opaque back wall of the lens.

The back wall when taken by itself presents nothing different from an ordinary flat screen but when faced with the wall 5 and the fluid body as shown herewith the pictures projected on said back wall through said wall 5 and said fluid body, appear stereoscopic that is the picture appears in greater depths than when using a conventional flat screen.

The back wall may be plated with mercury or it may comprise a narrow cell formed of two side members spaced and filled with mercury or it may be backed by any other suitable means which will portray the pictures properly.

Various changes may be made in the invention herein set forth without departing from the spirit thereof as claimed.

I claim:

1. In a screen for motion pictures, a front lenticular wall, a flat opaque back wall adapted to catch pictures projected through said front wall and to portray said pictures through said front wall, and a fluid body between said front lenticular wall and said flat back wall.

2. In a screen for moving pictures, a concavo-convex front lenticular wall, and a flat screen wall back of said lenticular wall and spaced therefrom to form a chamber between and adapted to catch pictures projected through said lenticular wall and to portray said pictures through said lenticular wall.

3. In combination, a curved front wall and an opaque back wall spaced therefrom to form a chamber between and adapted to form a screen for portraying pictures, the screen members adapted to catch pictures projected by light rays through said curved front wall upon said back wall whereby the pictures will be viewed through said curved front wall with a stereoscopic effect.

In testimony whereof I have signed my name to this specification.

CHAS. VICTOR HALL.